United States Patent
Li et al.

(10) Patent No.: US 10,383,140 B2
(45) Date of Patent: Aug. 13, 2019

(54) IDENTIFICATION OF COLLIDING UE FOR GRANT-FREE TRANSMISSION OF DATA AND SCHEDULING REQUEST BASED ON RESOURCE SUB-POOL ASSIGNMENTS FOR WIRELESS NETWORKS

(71) Applicant: NOKIA TECHNOLOGIES OY, Espoo (FI)

(72) Inventors: Zexian Li, Espoo (FI); Bikramjit Singh, Espoo (FI); Vinh Van Phan, Oulu (FI); Emad Farag, Flanders, NJ (US); Ling Yu, Kauniainen (FI); Mikko Aleksi Uusitalo, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/631,648

(22) Filed: Jun. 23, 2017

(65) Prior Publication Data
US 2018/0376493 A1 Dec. 27, 2018

(51) Int. Cl.
| H04W 72/02 | (2009.01) |
| H04W 72/04 | (2009.01) |
| H04W 72/08 | (2009.01) |
| H04W 72/12 | (2009.01) |
| H04W 76/10 | (2018.01) |

(52) U.S. Cl.
CPC ....... *H04W 72/1278* (2013.01); *H04W 72/02* (2013.01); *H04W 72/04* (2013.01); *H04W 72/042* (2013.01); *H04W 72/0406* (2013.01); *H04W 72/085* (2013.01); *H04W 72/1289* (2013.01); *H04W 76/10* (2018.02)

(58) Field of Classification Search
CPC . H04W 72/1278; H04W 76/10; H04W 72/04; H04W 72/02; H04W 72/0406; H04W 72/085

USPC .......................................................... 370/329
See application file for complete search history.

(56) References Cited

U.S. PATENT DOCUMENTS

| 2013/0163537 A1* | 6/2013 | Anderson | H04W 72/1284 370/329 |
| 2018/0199381 A1* | 7/2018 | Rong | H04W 74/08 |
| 2018/0227851 A1* | 8/2018 | Kubota | H04W 52/0229 |

OTHER PUBLICATIONS

"Simultaneous scheduling request and data transmission for uplink URLLC", R1-1705616, Qualcomm Incorporated, 3GPP TSG-RAN WG1 NR #88-bis, Apr. 3-7, 2017, Spokane, Washington, USA, 11 pages.

* cited by examiner

*Primary Examiner* — Christopher R Crompton
(74) *Attorney, Agent, or Firm* — Brake Hughes Bellermann LLP

(57) ABSTRACT

A technique includes receiving, by a first user device from a base station, control information indicating an assignment of the first user device to a first scheduling request sub-pool of resources of one or more scheduling request sub-pools, and an assignment of the first user device to a first data sub-pool of resources of one or more data sub-pools, wherein the sub-pools assigned to the first user device allow a contention-based grant-free mode transmission from the first user device of both a data and a scheduling request at the same time via different resources, wherein for at least a plurality of user devices no two user devices are assigned to both a same data sub-pool and a same scheduling request sub-pool.

27 Claims, 9 Drawing Sheets

IDENTIFICATION OF COLLIDING UE FOR GRANT-FREE TRANSMISSION OF DATA AND SCHEDULING REQUEST BASED ON RESOURCE SUB-POOL ASSIGNMENTS FOR WIRELESS NETWORKS

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the Long Term Evolution (LTE) of the Universal Mobile Telecommunications System (UMTS) radio-access technology. S-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. Ultra-reliable and low-latency communications (URLLC) devices may require high reliability and very low latency.

SUMMARY

According to an example implementation, a method includes receiving, by a first user device from a base station, control information indicating an assignment of the first user device to a first scheduling request sub-pool of resources of one or more scheduling request sub-pools, and an assignment of the first user device to a first data sub-pool of resources of one or more data sub-pools, wherein the sub-pools assigned to the first user device allow a contention-based grant-free mode transmission from the first user device of both a data and a scheduling request at the same time via different resources, wherein for at least a plurality of user devices no two user devices are assigned to both a same data sub-pool and a same scheduling request sub-pool.

According to an example implementation, an apparatus includes at least one processor and at least one memory including computer instructions, when executed by the at least one processor, cause the apparatus to: receive, by a first user device from a base station, control information indicating an assignment of the first user device to a first scheduling request sub-pool of resources of one or more scheduling request sub-pools, and an assignment of the first user device to a first data sub-pool of resources of one or more data sub-pools, wherein the sub-pools assigned to the first user device allow a contention-based grant-free mode transmission from the first user device of both a data and a scheduling request at the same time via different resources, wherein for at least a plurality of user devices no two user devices are assigned to both a same data sub-pool and a same scheduling request sub-pool.

According to an example implementation, an apparatus includes means for receiving, by a first user device from a base station, control information indicating an assignment of the first user device to a first scheduling request sub-pool of resources of one or more scheduling request sub-pools, and an assignment of the first user device to a first data sub-pool of resources of one or more data sub-pools, wherein the sub-pools assigned to the first user device allow a contention-based grant-free mode transmission from the first user device of both a data and a scheduling request at the same time via different resources, wherein for at least a plurality of user devices no two user devices are assigned to both a same data sub-pool and a same scheduling request sub-pool.

According to an example implementation, a computer program product includes a computer-readable storage medium and storing executable code that, when executed by at least one data processing apparatus, is configured to cause the at least one data processing apparatus to perform a method including: receiving, by a first user device from a base station, control information indicating an assignment of the first user device to a first scheduling request sub-pool of resources of one or more scheduling request sub-pools, and an assignment of the first user device to a first data sub-pool of resources of one or more data sub-pools, wherein the sub-pools assigned to the first user device allow a contention-based grant-free mode transmission from the first user device of both a data and a scheduling request at the same time via different resources, wherein for at least a plurality of user devices no two user devices are assigned to both a same data sub-pool and a same scheduling request sub-pool.

According to an example implementation, a method includes determining, by a base station, a hierarchical resource pool configuration to allow each of one or more user devices to use a contention-based grant-free mode to transmit both data and a scheduling request at the same time to the base station via different resources, the hierarchical resource pool configuration including a scheduling request pool that includes one or more scheduling request sub-pools, each scheduling request sub-pool including one or more resources to be used by a user device for an uplink transmission of a scheduling request, and a data pool that includes one or more data sub-pools, each of the data sub-pools including one or more resources to be used by a user device for an uplink transmission of data; the hierarchical resource pool configuration also including an assignment of each of a plurality of user devices served by the base station to one scheduling request sub-pool and to one data sub-pool, wherein no two user devices are assigned to a same sub-pool in both the scheduling request pool and the data pool to allow the base station to identify a failed user device in which grant-free mode transmissions of both data and a scheduling request from the failed user device collided with transmissions from other user devices; and sending, by the base station, control information indicating the assignment of each of one or more user devices to a scheduling request sub-pool and a data sub-pool.

According to an example implementation, an apparatus includes at least one processor and at least one memory including computer instructions, when executed by the at least one processor, cause the apparatus to: determine, by a base station, a hierarchical resource pool configuration to allow each of one or more user devices to use a contention-based grant-free mode to transmit both data and a scheduling request at the same time to the base station via different resources, the hierarchical resource pool configuration including a scheduling request pool that includes one or more scheduling request sub-pools, each scheduling request sub-pool including one or more resources to be used by a user device for an uplink transmission of a scheduling request, and a data pool that includes one or more data sub-pools, each of the data sub-pools including one or more resources to be used by a user device for an uplink transmission of data; the hierarchical resource pool configuration also including an assignment of each of a plurality of user devices served by the base station to one scheduling request sub-pool and to one data sub-pool, wherein no two user devices are assigned to a same sub-pool in both the scheduling request pool and the data pool to allow the base station to identify a failed user device in which grant-free mode transmissions of both data and a scheduling request from the failed user device collided with transmissions from other user devices; and send, by the base station, control information indicating the assignment of each of one or more user devices to a scheduling request sub-pool and a data sub-pool.

According to an example implementation, an apparatus includes means for determining, by a base station, a hierarchical resource pool configuration to allow each of one or more user devices to use a contention-based grant-free mode to transmit both data and a scheduling request at the same time to the base station via different resources, the hierarchical resource pool configuration including a scheduling request pool that includes one or more scheduling request sub-pools, each scheduling request sub-pool including one or more resources to be used by a user device for an uplink transmission of a scheduling request, and a data pool that includes one or more data sub-pools, each of the data sub-pools including one or more resources to be used by a user device for an uplink transmission of data; the hierarchical resource pool configuration also including an assignment of each of a plurality of user devices served by the base station to one scheduling request sub-pool and to one data sub-pool, wherein no two user devices are assigned to a same sub-pool in both the scheduling request pool and the data pool to allow the base station to identify a failed user device in which grant-free mode transmissions of both data and a scheduling request from the failed user device collided with transmissions from other user devices; and means for sending, by the base station, control information indicating the assignment of each of one or more user devices to a scheduling request sub-pool and a data sub-pool.

According to an example implementation, a computer program product includes a computer-readable storage medium and storing executable code that, when executed by at least one data processing apparatus, is configured to cause the at least one data processing apparatus to perform a method including: determining, by a base station, a hierarchical resource pool configuration to allow each of one or more user devices to use a contention-based grant-free mode to transmit both data and a scheduling request at the same time to the base station via different resources, the hierarchical resource pool configuration including a scheduling request pool that includes one or more scheduling request sub-pools, each scheduling request sub-pool including one or more resources to be used by a user device for an uplink transmission of a scheduling request, and a data pool that includes one or more data sub-pools, each of the data sub-pools including one or more resources to be used by a user device for an uplink transmission of data; the hierarchical resource pool configuration also including an assignment of each of a plurality of user devices served by the base station to one scheduling request sub-pool and to one data sub-pool, wherein no two user devices are assigned to a same sub-pool in both the scheduling request pool and the data pool to allow the base station to identify a failed user device in which grant-free mode transmissions of both data and a scheduling request from the failed user device collided with transmissions from other user devices; and sending, by the base station, control information indicating the assignment of each of one or more user devices to a scheduling request sub-pool and a data sub-pool.

According to an example implementation, a method includes receiving, by a first user device from a base station, control information indicating an assignment of the first user device to a first scheduling request sub-pool of one or more scheduling request sub-pools, and an assignment of the first user device to a first data sub-pool of one or more data sub-pools; wherein the one or more scheduling request sub-pools and the one or more data sub-pools are configured to allow each of one or more user devices to use a contention-based grant-free mode to transmit both data, via a resource of an assigned data sub-pool, and a scheduling request, via a resource of an assigned scheduling request sub-pool, at the same time to the base station, wherein no two user devices are assigned to both a same data sub-pool and a same scheduling request sub-pool to allow the base station to identify a failed user device in which grant-free mode transmissions of both data and a scheduling request from the failed user device collided with uplink transmissions from other user devices; and transmitting, by the first user device at the same time using a contention-based grant-free mode, both a first scheduling request via a resource of the first scheduling request sub-pool that is assigned to the first user device and a first data via a resource of the first data sub-pool that is assigned to the first user device.

According to an example implementation, an apparatus includes at least one processor and at least one memory including computer instructions, when executed by the at least one processor, cause the apparatus to: receive, by a first user device from a base station, control information indicating an assignment of the first user device to a first scheduling request sub-pool of one or more scheduling request sub-pools, and an assignment of the first user device to a first data sub-pool of one or more data sub-pools; wherein the one or more scheduling request sub-pools and the one or more data sub-pools are configured to allow each of one or more user devices to use a contention-based grant-free mode to transmit both data, via a resource of an assigned data sub-pool, and a scheduling request, via a resource of an assigned scheduling request sub-pool, at the same time to the base station, wherein no two user devices are assigned to both a same data sub-pool and a same scheduling request sub-pool to allow the base station to identify a failed user device in which grant-free mode transmissions of both data and a scheduling request from the failed user device collided with uplink transmissions from other user devices; and transmit, by the first user device at the same time using a contention-based grant-free mode, both a first scheduling request via a resource of the first scheduling request sub-pool that is assigned to the first user device and a first data via a resource of the first data sub-pool that is assigned to the first user device.

According to an example implementation, an apparatus includes means for receiving, by a first user device from a base station, control information indicating an assignment of the first user device to a first scheduling request sub-pool of one or more scheduling request sub-pools, and an assignment of the first user device to a first data sub-pool of one or more data sub-pools; wherein the one or more scheduling request sub-pools and the one or more data sub-pools are configured to allow each of one or more user devices to use a contention-based grant-free mode to transmit both data, via a resource of an assigned data sub-pool, and a scheduling request, via a resource of an assigned scheduling request sub-pool, at the same time to the base station, wherein no two user devices are assigned to both a same data sub-pool and a same scheduling request sub-pool to allow the base station to identify a failed user device in which grant-free mode transmissions of both data and a scheduling request from the failed user device collided with uplink transmissions from other user devices; and means for transmitting, by the first user device at the same time using a contention-based grant-free mode, both a first scheduling request via a resource of the first scheduling request sub-pool that is assigned to the first user device and a first data via a resource of the first data sub-pool that is assigned to the first user device.

According to an example implementation, a computer program product includes a computer-readable storage medium and storing executable code that, when executed by at least one data processing apparatus, is configured to cause the at least one data processing apparatus to perform a method including: receiving, by a first user device from a base station, control information indicating an assignment of the first user device to a first scheduling request sub-pool of one or more scheduling request sub-pools, and an assignment of the first user device to a first data sub-pool of one or more data sub-pools; wherein the one or more scheduling request sub-pools and the one or more data sub-pools are configured to allow each of one or more user devices to use a contention-based grant-free mode to transmit both data, via a resource of an assigned data sub-pool, and a scheduling request, via a resource of an assigned scheduling request sub-pool, at the same time to the base station, wherein no two user devices are assigned to both a same data sub-pool and a same scheduling request sub-pool to allow the base station to identify a failed user device in which grant-free mode transmissions of both data and a scheduling request from the failed user device collided with uplink transmissions from other user devices; and transmitting, by the first user device at the same time using a contention-based grant-free mode, both a first scheduling request via a resource of the first scheduling request sub-pool that is assigned to the first user device and a first data via a resource of the first data sub-pool that is assigned to the first user device.

According to an example implementation, a method includes receiving, by a first user device from a base station, control information indicating an assignment of the first user device to a scheduling request sub-pool of resources and to a data sub-pool of resources, wherein the sub-pools of resources assigned to the first user device allow a contention-based grant-free mode of transmission from the first user device of both a data and a scheduling request via different resources, wherein no two user devices are assigned to both a same data sub-pool and a same scheduling request sub-pool; and performing, by the first user device, a contention-based grant-free mode of transmission of data via a resource of the data sub-pool and a scheduling request via a resource of the scheduling request sub-pool. According to an example implementation, an apparatus includes at least one processor and at least one memory including computer instructions, when executed by the at least one processor, cause the apparatus to: receive, by a first user device from a base station, control information indicating an assignment of the first user device to a scheduling request sub-pool of resources and to a data sub-pool of resources, wherein the sub-pools of resources assigned to the first user device allow a contention-based grant-free mode of transmission from the first user device of both a data and a scheduling request via different resources, wherein no two user devices are assigned to both a same data sub-pool and a same scheduling request sub-pool; and perform, by the first user device, a contention-based grant-free mode of transmission of data via a resource of the data sub-pool and a scheduling request via a resource of the scheduling request sub-pool.

According to an example implementation, an apparatus includes means for receiving, by a first user device from a base station, control information indicating an assignment of the first user device to a scheduling request sub-pool of resources and to a data sub-pool of resources, wherein the sub-pools of resources assigned to the first user device allow a contention-based grant-free mode of transmission from the first user device of both a data and a scheduling request via different resources, wherein no two user devices are assigned to both a same data sub-pool and a same scheduling request sub-pool; and means for performing, by the first user device, a contention-based grant-free mode of transmission of data via a resource of the data sub-pool and a scheduling request via a resource of the scheduling request sub-pool.

According to an example implementation, a computer program product includes a computer-readable storage medium and storing executable code that, when executed by at least one data processing apparatus, is configured to cause the at least one data processing apparatus to perform a method including: receiving, by a first user device from a base station, control information indicating an assignment of the first user device to a scheduling request sub-pool of resources and to a data sub-pool of resources, wherein the sub-pools of resources assigned to the first user device allow a contention-based grant-free mode of transmission from the first user device of both a data and a scheduling request via different resources, wherein no two user devices are assigned to both a same data sub-pool and a same scheduling request sub-pool; and performing, by the first user device, a contention-based grant-free mode of transmission of data via a resource of the data sub-pool and a scheduling request via a resource of the scheduling request sub-pool.

According to an example implementation, a method includes sending, by a base station to a first user device, control information indicating an assignment of the first user device to a scheduling request sub-pool of resources and to a data sub-pool of resources, wherein the sub-pools of resources assigned to the first user device allow a contention-based grant-free mode of transmission from the first user device of both a data and a scheduling request via different resources, wherein for at least a plurality of user devices no two user devices are assigned to both a same data sub-pool and a same scheduling request sub-pool.

According to an example implementation, an apparatus includes at least one processor and at least one memory including computer instructions, when executed by the at least one processor, cause the apparatus to: send, by a base station to a first user device, control information indicating an assignment of the first user device to a scheduling request sub-pool of resources and to a data sub-pool of resources, wherein the sub-pools of resources assigned to the first user device allow a contention-based grant-free mode of transmission from the first user device of both a data and a scheduling request via different resources, wherein for at least a plurality of user devices no two user devices are assigned to both a same data sub-pool and a same scheduling request sub-pool.

According to an example implementation, an apparatus includes means for sending, by a base station to a first user device, control information indicating an assignment of the first user device to a scheduling request sub-pool of resources and to a data sub-pool of resources, wherein the sub-pools of resources assigned to the first user device allow a contention-based grant-free mode of transmission from the first user device of both a data and a scheduling request via different resources, wherein for at least a plurality of user devices no two user devices are assigned to both a same data sub-pool and a same scheduling request sub-pool.

According to an example implementation, a computer program product includes a computer-readable storage medium and storing executable code that, when executed by at least one data processing apparatus, is configured to cause the at least one data processing apparatus to perform a method including: sending, by a base station to a first user device, control information indicating an assignment of the first user device to a scheduling request sub-pool of resources and to a data sub-pool of resources, wherein the sub-pools of resources assigned to the first user device allow a contention-based grant-free mode of transmission from the first user device of both a data and a scheduling request via different resources, wherein for at least a plurality of user devices no two user devices are assigned to both a same data sub-pool and a same scheduling request sub-pool.

The details of one or more examples of implementations are set forth in the accompanying drawings and the description below. Other features will be apparent from the description and drawings, and from the claims.

DETAILED DESCRIPTION

Figure 1:
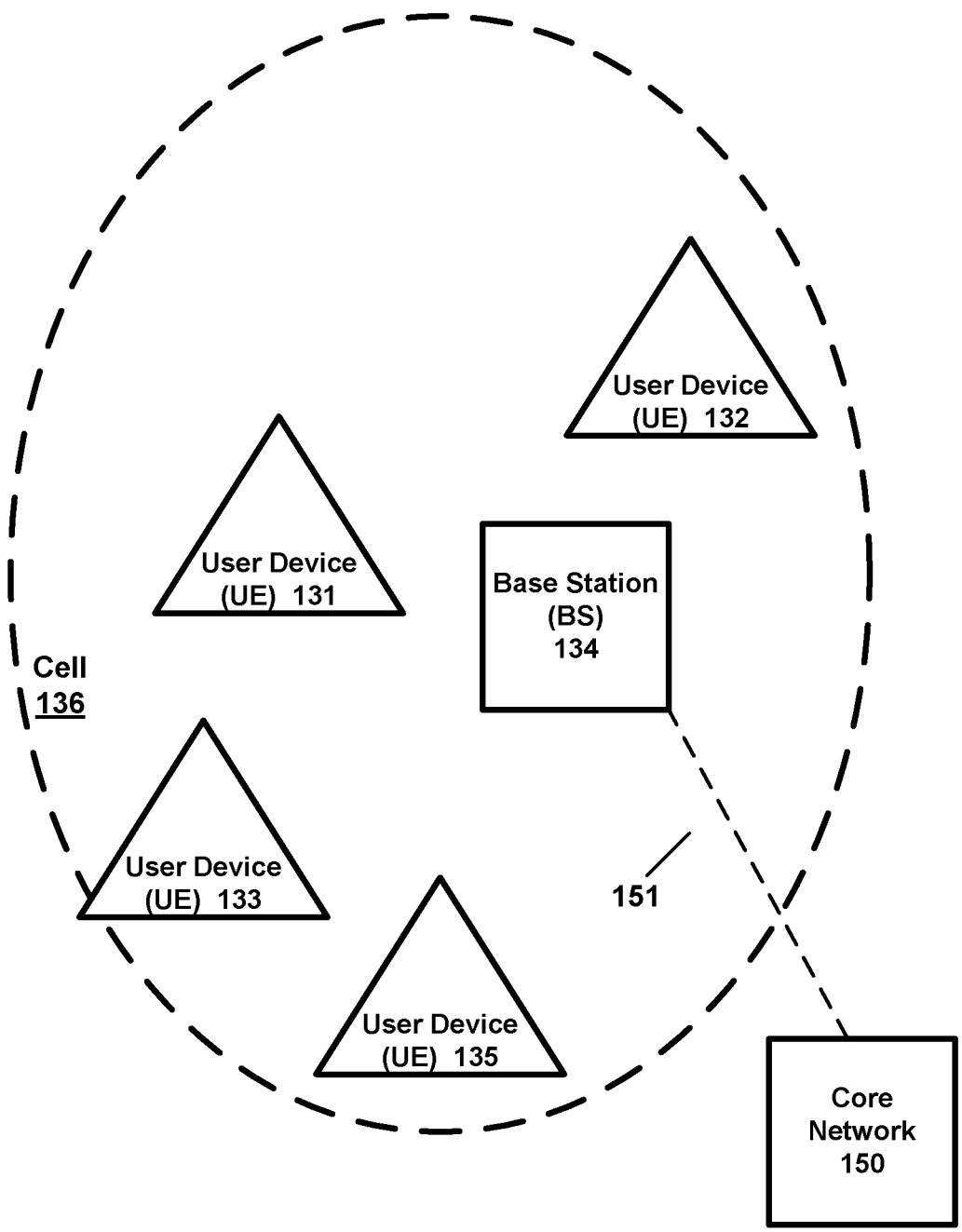
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB, or a network node. At least part of the functionalities of an access point (AP), base station (BS) or (e)Node B (eNB) may be also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE) or mobile station) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability)

The various example implementations may be applied to a wide variety of wireless technologies or wireless networks, such as LTE, LTE-A, 5G, cmWave, and/or mmWave band networks, IoT, MTC, eMTC, eMBB, URLLC, etc., or any other wireless network or wireless technology. These example networks, technologies or data service types are provided only as illustrative examples.

Some systems may allow a UE/user device to send a scheduling request to obtain uplink resources, and then the UE may either send data or send a buffer status report (BSR) via such UL resource to request additional resources. This process may introduce significant latency, e.g., which may be unacceptable for some types of UEs, such as URLLC UEs or UEs with ongoing URLLC services. Also, in some cases, it may be difficult for a BS to detect a collision of signals between two UEs and/or to identify which UEs collided in case UL grant-free transmission is applied.

Therefore, according to an example implementation, a hierarchical resource pool configuration may be provided to allow each of one or more user devices to transmit, via a contention-based grant-free mode, both data and a scheduling request at the same (or different depending on the resource configuration) time instance via different resources. In the following we are taking the same time instance as illustrative example. According to an illustrative example implementation, a contention-based grant-free transmission may include a UE contending for transmission with other UEs (using a set of shared resources), and transmitting both data and a scheduling request without first receiving a specific UL grant from the BS. According to an example implementation, the hierarchical resource pool configuration may include assigning each of one or more user devices to a data sub-pool of one or more data sub-pools within a data pool, and assigning each UE to a scheduling request sub-pool of one or more scheduling request sub-pools within a scheduling request pool. By a UE transmitting at the same time both data and a scheduling request via different resources, this may, for example, allow a BS to detect a failure to receive a transmitted data (e.g., based on receipt of only a scheduling request from a UE, where the data was not received), and then the BS may send an UL grant to the UE/user device (e.g., in the case where the data does not arrive due to a collision with another UE's UL transmission).

However, in the case of a transmission from a UE/user device of both data and a scheduling request at the same time via different resources, there is a possibility that both the data and the scheduling request are not received by the BS due to collisions with uplink (UL) transmissions from other UEs/user devices. Therefore, according to an example implementation, at least in some cases, the UEs may be assigned to data and scheduling request sub-pools in a manner to allow the BS to uniquely identify a UE for which both its transmitted data and scheduling request collided with transmissions from other UEs. According to an example implementation, to allow the BS to identify a UE for which both its data and scheduling request suffered a collision, a BS may assign UEs to sub-pools, wherein no two UEs/user devices are assigned to both the same data sub-pool and the same scheduling request sub-pool. Thus, for example, in such an assignment configuration, if UE#1 and UE#5 are assigned to share resources of data sub-pool 1 (for example) (for UL transmission of data), then UE#1 and UE#5 will not be allowed to share resources of a same scheduling request sub-pool, but should be assigned to different scheduling request sub-pools. Thus, for example, in such a case, UE#1 may be assigned to scheduling request sub-pool 3, and UE#5 may be assigned to scheduling request sub-pool 2, for example (e.g., UE#1 and UE#5 assigned to different scheduling request sub-pools). And, the BS may, for example, avoid assigning UE#1 and UE#5 to the same scheduling request sub-pool.

Therefore, according to an example implementation, a method may include receiving, by a first user device from a base station, control information indicating an assignment of the first user device to a scheduling request sub-pool of resources and to a data sub-pool of resources, wherein the sub-pools of resources assigned to the first user device allow a contention-based grant-free mode of transmission from the first user device of both a data and a scheduling request via different resources, wherein no two user devices are assigned to both a same data sub-pool and a same scheduling request sub-pool; and performing, by the first user device, a contention-based grant-free mode of transmission of data via a resource of the data pool and a scheduling request via a resource of the scheduling request pool.

According to another example implementation, a method includes sending, by a base station to a first user device, control information indicating an assignment of the first user device to a scheduling request sub-pool of resources and to a data sub-pool of resources, wherein the sub-pools of resources assigned to the first user device allow a contention-based grant-free mode of transmission from the first user device of both a data and a scheduling request via different resources, wherein no two user devices are assigned to both a same data sub-pool and a same scheduling request sub-pool.

According to another example implementation, a method may include receiving, by a first user device from a base station, control information indicating an assignment of the first user device to a first scheduling request sub-pool of resources of one or more scheduling request sub-pools, and an assignment of the first user device to a first data sub-pool of resources of one or more data sub-pools, wherein the sub-pools assigned to the first user device allow a contention-based grant-free mode transmission from the first user device of both a data and a scheduling request at the same time via different resources; wherein no two user devices are assigned to both a same data sub-pool and a same scheduling request sub-pool.

According to an example implementation, by assigning user devices to sub-pools such that no two user devices are assigned to both a same data sub-pool and a same scheduling request sub-pool may allow the base station to detect a collision condition for the first user device with respect to both data and a scheduling request, in which a grant-free mode transmission of both a data and a scheduling request at the same time from the first user device collided with uplink transmissions from other user devices. Thus, for example, this example technique may allow the BS to uniquely identify the user device (e.g., the first user device in this example) for which a collision occurred for both a data and a scheduling request transmitted by the user device.

According to an example implementation, the method may further include performing, by the first user device, a contention-based grant-free mode transmission at the same time of both a data, via a resource of the assigned first data sub-pool, and a scheduling request, via a resource of the first scheduling request sub-pool.

According to another example implementation, the method may further receiving, by the first user device from the base station in response to the base station detecting that both the first scheduling request and the first data transmitted by the first user device collided with transmissions from other user devices, an uplink grant that identifies a dedicated resource for the first user device to retransmit the first data; and, retransmitting, by the first user device to the base station, the first data via the dedicated resource.

According to another example implementation, another method may include determining, by a base station, a hierarchical resource pool configuration to allow each of one or more user devices to use a contention-based grant-free mode to transmit both data and a scheduling request at the same time to the base station via different resources, the hierarchical resource pool configuration including a scheduling request pool that includes one or more scheduling request sub-pools, each scheduling request sub-pool including one or more resources to be used by a user device for an uplink transmission of a scheduling request, and a data pool that includes one or more data sub-pools, each of the data sub-pools including one or more resources to be used by a user device for an uplink transmission of data; the hierarchical resource pool configuration also including an assignment of each of a plurality of user devices served by the base station to one scheduling request sub-pool and to one data sub-pool, wherein no two user devices are assigned to a same sub-pool in both the scheduling request pool and the data pool to allow the base station to identify a failed user device in which grant-free mode transmissions of both data and a scheduling request from the failed user device collided with transmissions from other user devices; and sending, by the base station, control information indicating the assignment of each of one or more user devices to a scheduling request sub-pool and a data sub-pool.

According to an example implementation, another method may include receiving, by a first user device from a base station, control information indicating an assignment of the first user device to a first scheduling request sub-pool of one or more scheduling request sub-pools, and an assignment of the first user device to a first data sub-pool of one or more data sub-pools; wherein the one or more scheduling request sub-pools and the one or more data sub-pools are configured to allow each of one or more user devices to use a contention-based grant-free mode to transmit both data, via a resource of an assigned data sub-pool, and a scheduling request, via a resource of an assigned scheduling request sub-pool, at the same time to the base station, wherein no two user devices are assigned to both a same data sub-pool and a same scheduling request sub-pool to allow the base station to identify a failed user device in which grant-free mode transmissions of both data and a scheduling request from the failed user device collided with uplink transmissions from other user devices; and transmitting, by the first user device at the same time using a contention-based grant-free mode, both a first scheduling request via a resource of the first scheduling request sub-pool that is assigned to the first user device and a first data via a resource of the first data sub-pool that is assigned to the first user device.

Example implementations may provide a combined solution of deterministic and probabilistic resource allocation to enable i) ultra-low latency by grant-free contention based transmission and at the same time ii) ultra-high reliability by deterministic dedicated resource allocation for fast recovering of the data transmission failure caused by collision. Example implementations may include one or more of the following:

1) The serving network (e.g., serving BS) provides the hierarchical resource pool configuration for grant-free SR (scheduling request) and data transmission either with dedicated or broadcasted signalling, wherein the hierarchical resource pools are configured in the way to allow the serving network (e.g., serving BS) to determine the individual UE even in case of collision happened in both SR and data transmission;

2) UE selects the resources from the configured sub-pools to transmit SR (scheduling request) and data at the same time and in grant-free manner to the serving network/serving BS; and/or 3) The serving network/serving BS determines the individual UE to grant the dedicated resources for data transmission in case of collision in the first data transmission.

Grant-free based transmission of SR (scheduling request) and data in separate pools may typically increase reliable transmission due to diversity in transmissions. However, considering 99.999% target, still there is a viable probability that SR and data packet of the same UE can collide with others, and the network/BS may not be able to identify or decode the collided UE. In order to address this issue, an example implementation/solution may include a combination of deterministic and/or random resource allocation. This may be done by introducing sub-pools where only specific UEs are allowed, e.g., on the basis of UE ID (UE identifier) or other rules. These sub-pools can be designed in the parent pools (SR pool and data pool) in such a manner that no two UEs contend in the same sub-pool from both pools at the same time. For this, the pool sub-division (or number of sub-pools) may, for example, follow the constraint $$M_{SR} \times M_D = N^{max} \quad \text{Eq. (1)}$$

where $M_{SR}$ the number of SR sub-pools in SR pool 210, $M_D$ the number data sub-pools in data pool 220, and N' represents the maximum number of UEs allowed for URLLC transmissions (for example). For example, with $N^{max}=12$ UEs, we can allocate UEs in different pools as depicted in FIG. 2 (3 SR sub-pools in SR pool 210, and 4 data sub-pools in data pool 220).

Figure 2:
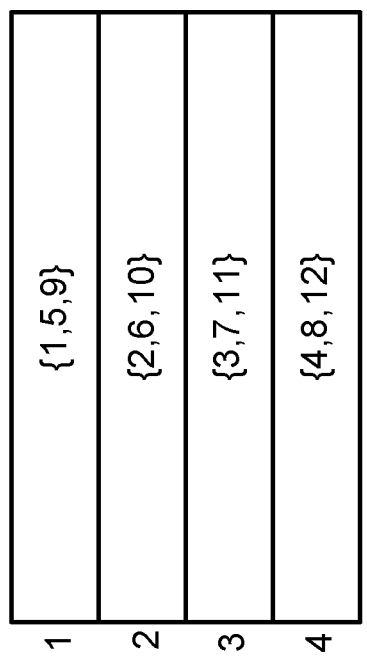
FIG. 2 is a diagram illustrating a scheduling request pool 210 and a data pool 220 according to an example implementation.
Figure 2:
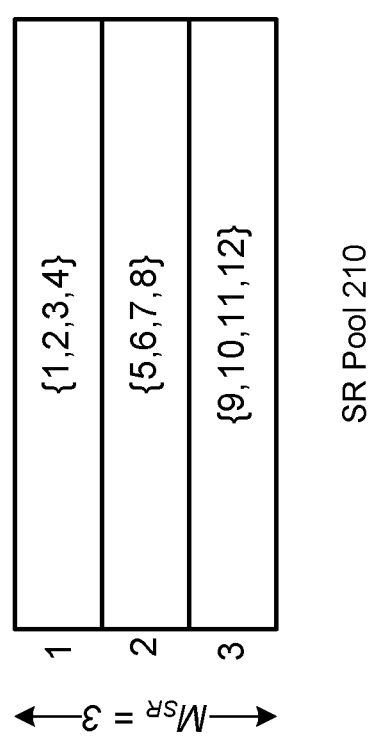

FIG. 2 is a diagram illustrating a scheduling request pool 210 and a data pool 220 according to an example implementation. Each sub-pool shown in FIG. 2 indicates the UE IDs that are allowed to use resources for such sub-pools. For example, each sub-pool may be assigned a group of time/frequency/code resources. For example, each sub-pool may include a group of 6 resources, which may be used for UL transmission by the UEs that are assigned to that sub-pool. Each of UEs #1-12 are assigned to a SR (scheduling request) sub-pool and a data sub-pool. SR pool 210 includes three SR sub-pools, including SR sub-pool 1 (including UE#s 1, 2, 3, 4), SR sub-pool 2 (including UE#s 5, 6, 7, 8) and SR sub-pool 3 (including UE#s 9, 10, 11, 12). Data pool 220 includes four data sub-pools including data sub-pool 1 (including UE#s 1, 5, 9), data sub-pool 2 (including UE#s 2, 6, 10), data sub-pool 3 (including UE#s 3, 7, 11), and data sub-pool 4 (including UE#s 4, 8, 12). According to an example implementation, no two UEs are assigned to both a same SR sub-pool and a same data sub-pool. For example, UE#1 and UE#2 are assigned to the same SR sub-pool 1, but are assigned to different data sub-pools (UE#1 is assigned to data sub-pool 1, and UE#2 is assigned to data sub-pool 2).

Likewise, for example, UE#3 and UE#7 are assigned to the same data sub-pool 3, but are assigned to different SR sub-pools.

The collision rate may increase for a pool subdivided into various sub-pools, i.e., collision rate over individual smaller sub-pools, in comparison to single large pool. However, due to the fixed (deterministic) allocation of sub-pools from two large pools for SR and data, collisions can be uniquely identified for a UE which has both data and SR collided with different UEs' SR and data packets. Simultaneous collision between the same UEs for both data and SR cannot happen. See FIG. 2 wherein, according to an example implementation, the same pair of UEs will not contend in (or share resources within) the same sub-pool in both SR pool 210 and data pool 220.

Resource Allocation Example

With $N^{max}$ UEs, the UEs can be arranged in a matrix fashion with row and column size equal to $M_{SR}$ and $M_D$ or vice-versa, such that $$\{N^{max}\} \equiv \begin{pmatrix} 1 & \cdots & 1+(M_{SR}-1)\,M_D \\ \vdots & \ddots & \vdots \\ M_D & \cdots & M_{SR}\,M_D \end{pmatrix}. \qquad \text{Eq. (2)}$$

where $M_{SR} \times M_D = N^{max}$ (see Eq. (2)). This means, for example, that in one parent pool (e.g., SR pool 210 or data pool 220), UEs can contend in the sub-pools based on their column IDs for a given row and in another pool, UEs based on their row IDs for a given column are selected. Within the sub-pools (e.g., using a resource within an assigned sub-pool), UEs may transmit in a contention-based manner.

For example with $N^{max}=12$ UEs. With this, many combinations are possible, e.g., 1×12, 2×6 and 4×3. In an illustrative example, a combination 4×3 may be used, where SR pool 210 is divided into 3 sub-pools and data pool 220 is divided into 4 sub-pools. The UE IDs associated with these sub-pools may be, for example:

$$\{12\} \equiv \begin{pmatrix} 1 & 5 & 9 \\ 2 & 6 & 10 \\ 3 & 7 & 11 \\ 4 & 8 & 12 \end{pmatrix}. \qquad \text{Eq. (3)}$$

As data pool 220 has 4 sub-pools. Then in each sub-pool, 3 UEs are allowed for contention, with UE IDs={1,5,9}, in first sub-pool (data sub-pool 1), and so on, see Eq. (3). Similarly for SR pool 210, 3 sub-pools are available with UE IDs={1,2,3,4} in SR sub-pool 1, and so on, see Eq. (32). We see that no two UEs contend in the same sub-pool in the both parent pools, see FIG. 2.

Moreover, for the given example with $N^{max}=12$ UEs, there are 3 combinations, and for each combination 2 permutations are possible. Overall 6 combinations are possible. Based on the traffic pattern and total resource amount, network can appropriate select combination which yields collision rate estimate no more than the URLLC target of 99.999%.

Further, to make UEs aware about the transmission procedure, either network/BS can use a unicast message to let UEs know what sub-pool they are allowed to contend within the parent pools (sub-pool assignments), or network/BS can use a single broadcast/multicast message, where UEs themselves decode the sub-pools they are allowed to transmit in.

For, e.g., gNB can provide few parameters in the broadcast message, e.g., number of sub-pools in SR pool 210 and data pool 220, sub-pool sizes (number of resources in each sub-pool), data sub-pool selection column wise according to the UE ID, and SR sub-pool selection row wise according to the UE ID or vice-versa, etc. As $N^{max}$ may vary with time, hence the information may be updated, e.g., at specific or regular intervals or triggered by sufficient change in total number of URLLC UEs. Further, based on the UE population, traffic pattern, resources, reliability constraints, gNB can optimize the data and scheduling request pool/sub-pool size to deliver URLLC services with, e.g., $P_{rel}=99.999\%$ reliability within 1 ms latency bound.

Collision Detection

Further, many collision UEs can be decoded due to deterministic allocation of sub-pools. In an example implementation, a BS may use the successful transmissions received from other UEs in a SR sub-pool and a data sub-pool to determine a UE that suffered a collision in both of these SR and data sub-pools. In an illustrative example, each of UE #1, #2 and #9 transmits SR and data at the same time. In this illustrative example, UE #1 collides with UE #2 in SR sub-pool 1, and UE #1 collides with UE #9 in data sub-pool 1. Network detects possible successful transmission of UE #2's data packet (but does not detect SR from UE#2) and UE #9's SR packet (but does not receive data transmission from UE#9) in other sub-pools. However, UE #2 and UE #9 suffer collision in sub-pool 1 of both pools, and therefore network can assume that other's UE identity must be UE #1 as UE #1 is common to both sub-pools where collision happens. According to an illustrative example, the BS may determine an overlap (or common UEs) of the two sub-pools where collisions occurred to identify the UE for which a collision occurred for both of its transmitted data and SR. Thus, in this example, the BS may compare UEs assigned to SR sub-pool 1 to UEs assigned to data sub-pool 1, and the only common or overlapping UE in both of these sub-pools is UE#1 (see FIG. 2). Thus, based on the assignment of UEs to SR sub-pools and data sub-pools wherein no two UEs share both a data sub-pool and a SR sub-pool, the BS may identify a UE (UE #1 in this example) for which both its SR and data transmissions (at the same time) suffered collisions with UL transmissions from other UEs.

False Alarm Analysis

According to an example implementation, to proceed with contention access, UEs should know or have the information to decode the contention resource sub-pool allocation before-hand (e.g., a UE should know the size and/or resources of the sub-pools it has been assigned to). The pool size/allocation can be static or dynamically changed based on UE traffic pattern, reliability constraints, number of re-transmissions, etc., and may be communicated by the BS to the UEs at regular intervals or after every update, for example. The grant-free data and scheduling request transmissions can occur either in initial (first) or re-transmissions or both.

Consider a gNB supporting URLLC services to a number of machines in a factory automation scenario. These machines are fixed and have publicly known identity. So the gNB has the possibility to keep track of the traffic intensities each of these machines. In an example implementation, a machine initiates transmission activity where it always sends data and request packets in the first transmission in the designated pools in a contention-based manner as shown in FIG. 2. Consider an example communication scenario: The example parameters are listed in below Table 1.

TABLE 1

Table 1: Parameters

| | |
|---|---|
| Total number of URLLC UEs | N |
| Packet (SR/data) arrival | Poisson distributed |
| Average packet inter-arrival | $\mu$ |
| SR packet size | 1 resource block per TTI |
| Data packet size | L resource blocks per TTI |
| Number of pools | 2 (SR and data pools) |
| Number of channels in SR pool | $K_{SR}$ |
| Number of channels in data pool | $K_D$ |
| Relation between K, $K_{SR}$ and $K_D$. | $K_{SR} + K_D = K$ |
| Number of channels in SR sub-pool | $K_{SR, \delta} = K_{SR}/M_{SR}$ |
| Number of channels in data sub-pool | $K_{D, \delta} = K_D/M_D$ |
| Number of UEs in SR sub-pool | $N_{SR, \delta} = N^{max}/M_{SR} = M_D$ |
| Number of UEs in data sub-pool | $N_{D, \delta} = N^{max}/M_D = M_{SR}$ |

According to an example implementation, during transmission, if data packet of a UE is collided and cannot be decoded at BS, but SR for same UE is received successfully by BS, a grant-based allocation of UL resources can be provided on a separate (e.g., dedicated) resource (not in a contention resource). On the other hand, if data packet is received successfully from a UE and SR from the same UE is not received, then no action is required (since data has been received). But there might be a case where both SR and data packet of a same UE fails due to the collisions in both sub-pools. Then one way to provide a collision-free transmission is to allocate resource in case a UE is common to both sub-pools. For example, in FIG. 2, if there is collision in sub-pool 1 of SR pool and sub-pool 2 of data pool, one UE could be UE #2 beside others. Other UEs can be identified if their other packets (SR/data) are received successfully or not.

Considering the same example, UE #1 and UE #3 may collide (for example) in sub-pool 1 of SR pool 210 and UE #6 and UE #10 collide in sub-pool 2 of data pool 220. All these UEs #1, #3, #6 and #10 can be identified if their other packets are received successfully. However, if UE #2 collides also in the both pools with the collided UEs, a BS may not be able to determine or predict whether UE #2 is present or not (in case collisions happen with more than two UEs). In such cases, a common UE to both sub-pools may or may not present. To provide a fast or low latency transmission possibility, the network/BS may allocate resources and send an UL grant to the common UE (the UE that is assigned to both sub-pools where collisions were detected). However, in some cases, this may increase false alarms, e.g., where the resource (e.g., dedicated resource via an UL grant) is allocated to the UE, but the UE actually has no data to transmit. Let us consider the false alarms the allocation error as it causes resource inefficiency while ensuring the reliability.

According to an example implementation, to estimate a false alarm probability, first the collision rate is determined amongst the other UEs in a TTI (transmission time interval) while a common UE to the both sub-pools of the parent pools does not transmit (e.g., UE #5 in SR sub-pool 2 and data sub-pool 1). Consider a sub-pool of size $K_Z$ resource blocks in a TTI where $N_Z$ UEs with average inter-arrival equal to $\mu$ contends for the access slot, where Z denotes the sub-pool type, i.e., $Z \in \{SR, data\}$. Probability that a common UE to have no random transmission event(s) (i.e. packets to transmit) in a TTI is $$P_o = e^{-\mu}.$$  Eq. (4)

Next, the collision probability is determined amongst the other $N_Z - 1$ UEs in a TTI over contention resource $K_Z$, when this common UE do not transmit in the both sub-pools. We denote $P_{c,N_{SR},K_{SR}}(\mu, N_{SR}, K_{SR})$ the collision probability in SR sub-pool and $P_{c,N_D,K_D}(\mu, N_D, K_D, L)$ the collision probability in data sub-pool. Multiplying both and $P_o$, we get false alarm probability as $$P_{fa} = P_o \times P_{c,N_{SR},K_{SR}} \times P_{c,N_D,K_D}$$  Eq. (5)

Figure 3:
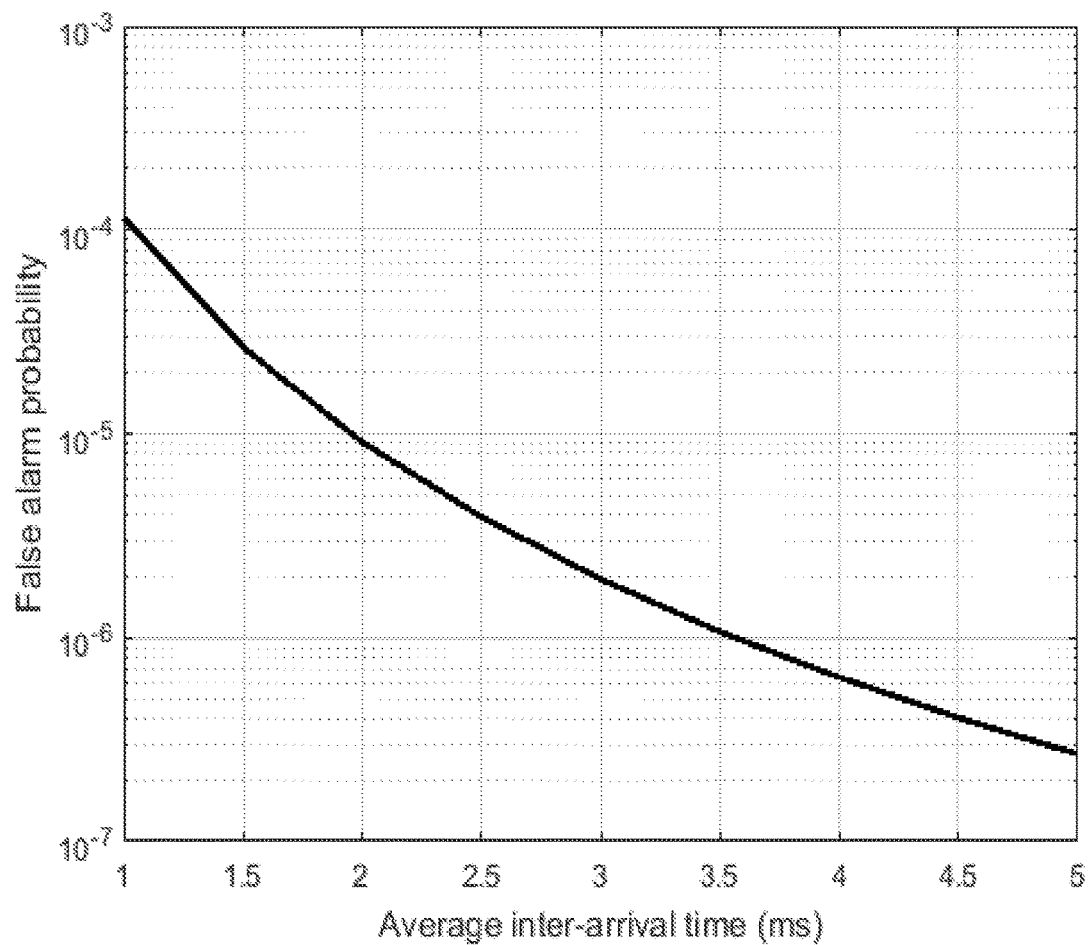
FIG. 3 is a diagram illustrating a false alarm probability according to an example implementation.

According to an illustrative example, FIG. 3 is a diagram illustrating the false alarm probability against the average inter-arrival time $\lambda$, where $\lambda = T/\mu$, and T is the 5G TTI size, i.e., T=0.125 ms. The curve is drawn for parameters for N=12, L=2, $K_{SR}$=2 and $K_D$=4.

Various example implementations may provide an effective use of fast contention based access for URLLC (or other type of UEs) wherein, using the sub-pool division and deterministic allocation of sub-pools for SR (scheduling request) and data transmissions for individual UEs and may provide or include one or more of the following:

simultaneous collision between the same UEs for both data and SR will not typically occur (e.g., due to sub-pool assignments);

collisions for a UE which has both data and SR collided with different UEs' SR and data packets can now be constrained and uniquely identified, thus fully controllable and resolvable right away without any further delay by, e.g., polling for all the identified UEs. For example, after a collided (failed) UE is identified that both its SR and data have collided with transmissions from other UEs, the BS may either 1) send an UL grant to (each of) the collided/failed UE(s), indicating a dedicated resource, to allow the UE to retransmit its data via non-contention access, or 2) send a poll or request to the collided/failed UE(s) to determine if the collided UE(s) has (have) data for transmission, and the UE may reply with an UL resource request, such as a buffer status report (e.g., indicating data for transmission), and then the BS may send the UE an UL grant (identifying a dedicated resource) to the UE if the UE has data for UL transmission.

Possible Extension(s) and/or Additional Example Implementations

Some additional example implementations will now be described with respect to the sub-pool division. In one case, having no sub-pool division may be used or provided, e.g., because a large pool may be considered to be a single sub-pool. In another example case, a sub-pool may consist of a single resource unit or instance of the large pool, also referred to as maximum sub-pool division (only one resource in each sub-pool, providing a larger or even maximum number of sub-pools, limited by the number of resources). In this case, the deterministic allocation of such the sub-pool for individual UE(s) is actually applied on the individual resource unit or instance of the large pool. The capacity constraint defined in Eq. (1) can be relaxed or extended for the following example implementations or extensions.

Additional Example Implementation-1

Considers the case in which the SR pool consists of $M_{SR}$ sub-pools, each sub-pool is a single resource unit or instance of the SR pool, and the data pool is not sub-divided, i.e., $M_D=1$. (Or, data pool includes only one sub-pool). In this extension, the capacity constraint defined in Eq. (1) may be extended to:

$$N^{max} = q \times M_{SR} \times M_D = q \times M_{SR}$$  Eq. (6)

wherein q, a positive integer, is introduced as a system parameter that no more than q different UEs may be allocated to use the same resource unit or instance of the SR pool: This allocation may be realized implicitly to reduce signalling overhead by, for example, a smart assignment of UE ID such as C-RNTI which can then be used to derive the corresponding allocated SR resource unit with e.g. (C-RNTI mod $M_D$). For grant-free data transmission, UE may, for example, randomly select a resource unit from the data pool. Thus, if collisions happen in both SR resource and data resource the network may be able to determine and poll up to q UEs which may send on the SR resource.

An Example of Additional Example Implementation-1

A SR pool includes 20 sub-pools with 1 resource in each of the 20 SR sub-pools. A data pool is not divided and includes 1 resource. If there are less than 20 UEs/user devices in the system, then the BS can assign each UE a dedicated SR scheduling resource, which allows a unique identification of a colliding UE (a UE in which both data and SR collided with other UE's transmissions). If there are more UEs that dedicated resources, then the BS may be able to identify a set of UEs for which a collision in both data and SR occurred, but may not be able to identify a specific UE, in this illustrative example that may use a dedicated resource assigned to a UE.

Additional Example Implementation-2

Is the same or similar to example implementation-1, but the opposite situation, e.g., in which the SR pool is not sub-divided, $M_{SR}=1$, and the data pool has the maximum sub-pool division, each SR sub-pool includes an individual resource unit.

Additional Example Implementation-3

The maximum sub-pool division may be applied on both the SR pool and the data pool, maximizing the capacity constraint defined by Eq. (1). It can be seen that the deterministic sub-pool or resource allocation over the 2 large pools help narrowing down those UEs to be polled if collisions happen to both SR and data.

For example, a SR pool has 20 resources (e.g., 1 SR resource shared by 5 UEs), and data pool has 10 resources (one data resource shared by 10 UEs), then capacity can be up to 200 UEs, according to Eq. (1); and each sub-pool has 1 resource, for both data and SR. This would allow for identification of a set of UEs that may have collided, worst case, e.g., for 200 users. If there are less than 30 users, then each user can have a dedicated resource for either SR or data, allowing unique ID of colliding UE. If there are more than 30 (or more than available resources in SR and data pools), then for example, the BS, at least in some cases, may only be able to identify a set of possible UEs that may have suffered a collision. Thus, for example, a plurality of SR resources and a plurality of data resources are provided, wherein each UE is assigned to a dedicated resource of either a SR resource or a data resource for each UE, e.g., to allow a unique identification of colliding UE. If the number of UEs assigned to resource pools is too large to allow dedicated resource, then BS would be able to identify only a set of UEs that may have collided.

Additional Example Implementation-4

Consider the case when the number of UEs available in the network is less than $N^{max}$ where $N^{max}=M_{SR} \times M_D$. In this case, the users are distributed evenly among pools (as much as possible) to minimize the probability collision within each pool. For example, if $N^{max}=12$, and $M_{SR}=3$ and $M_D=4$, but with only N=8 (8 UEs), the UEs should be evenly distributed among the pools, this can be done as follows $$\{8\} \equiv \begin{pmatrix} NA & 3 & 6 \\ 1 & NA & 7 \\ 2 & 4 & NA \\ NA & 5 & 8 \end{pmatrix}, \quad \text{Eq. (7)}$$

Otherwise, the network/BS should update the sub-pools with, e.g., $M_{SR}=2$ and $M_D=4$, so that $M_{SR} \times M_D=8$.

Additional Example Implementation-5

Consider the case when the number of UEs available in the network is more than $N^{max}$, where $N^{max}=M_{SR} \times M_D$. In this case, the users are distributed evenly among as pools (as much as possible) to minimize the probability collision within each pool. In this case, it is possible that more than one UE may collide in the same SR and data pools. If N is the total number of UEs in the network, no more than ceiling $(N/N^{max})$ UEs should collide in the same SR and data pools. For example, if $N^{max}=12$, and $M_{SR}=3$ and $M_D=4$, but with only N=13 (13 UEs), the UEs should be evenly distributed among the pools, this can be done as follows $$\{16\} \equiv \begin{pmatrix} 1, 13 & 5 & 9 \\ 2 & 6, 14 & 10 \\ 3 & 7 & 11, 15 \\ 4, 16 & 8 & 12 \end{pmatrix}. \quad \text{Eq. (8)}$$

A number of different illustrative examples will now be described.

Example 1

Figure 4:
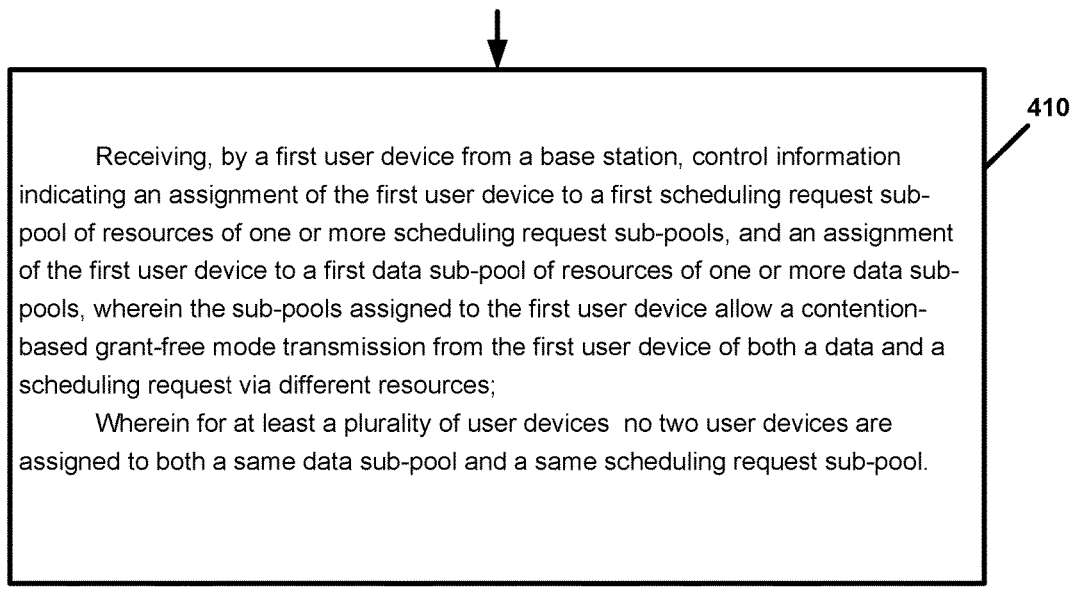
FIG. 4 is a flow chart illustrating operation of a user device/UE according to an example implementation.

FIG. 4 is a flow chart illustrating operation of a user device/UE according to an example implementation. Operation 410 includes receiving, by a first user device from a base station, control information indicating an assignment of the first user device to a first scheduling request sub-pool of resources of one or more scheduling request sub-pools, and an assignment of the first user device to a first data sub-pool of resources of one or more data sub-pools, wherein the sub-pools assigned to the first user device allow a contention-based grant-free mode transmission from the first user device of both a data and a scheduling request via different resources; wherein for at least a plurality of user devices, no two user devices are assigned to both a same data sub-pool and a same scheduling request sub-pool.

Example 2

According to an example implementation of the method of example 1, wherein no two user devices are assigned to both a same data sub-pool and a same scheduling request sub-pool to allow the base station to detect a collision condition for the first user device with respect to both data and a scheduling request, in which a grant-free mode transmission of both a data and a scheduling request at the same time from the first user device collided with uplink transmissions from other user devices.

Example 3

According to an example implementation of the method of any of examples 1-2, and further comprising performing, by the first user device, a contention-based grant-free mode transmission at the same time of both a data, via a resource of the assigned first data sub-pool, and a scheduling request, via a resource of the first scheduling request sub-pool.

Example 4

According to an example implementation of the method of any of examples 1-3, and further comprising receiving, by the first user device from the base station, an uplink grant that identifies a dedicated resource for the first user device to retransmit the first data; and retransmitting, by the first user device to the base station, the first data via the dedicated resource.

Example 5

According to an example implementation of the method of any of examples 1-4, wherein the assignment for the first user device comprises a dedicated resource that is dedicated to the first user device and is not shared among multiple user devices, the dedicated resource being from either the first scheduling request sub-pool or the first the data sub-pool.

Example 6

An apparatus comprising at least one processor and at least one memory including computer instructions, when executed by the at least one processor, cause the apparatus to perform the method of any of examples 1-5.

Example 7

Figure 5:
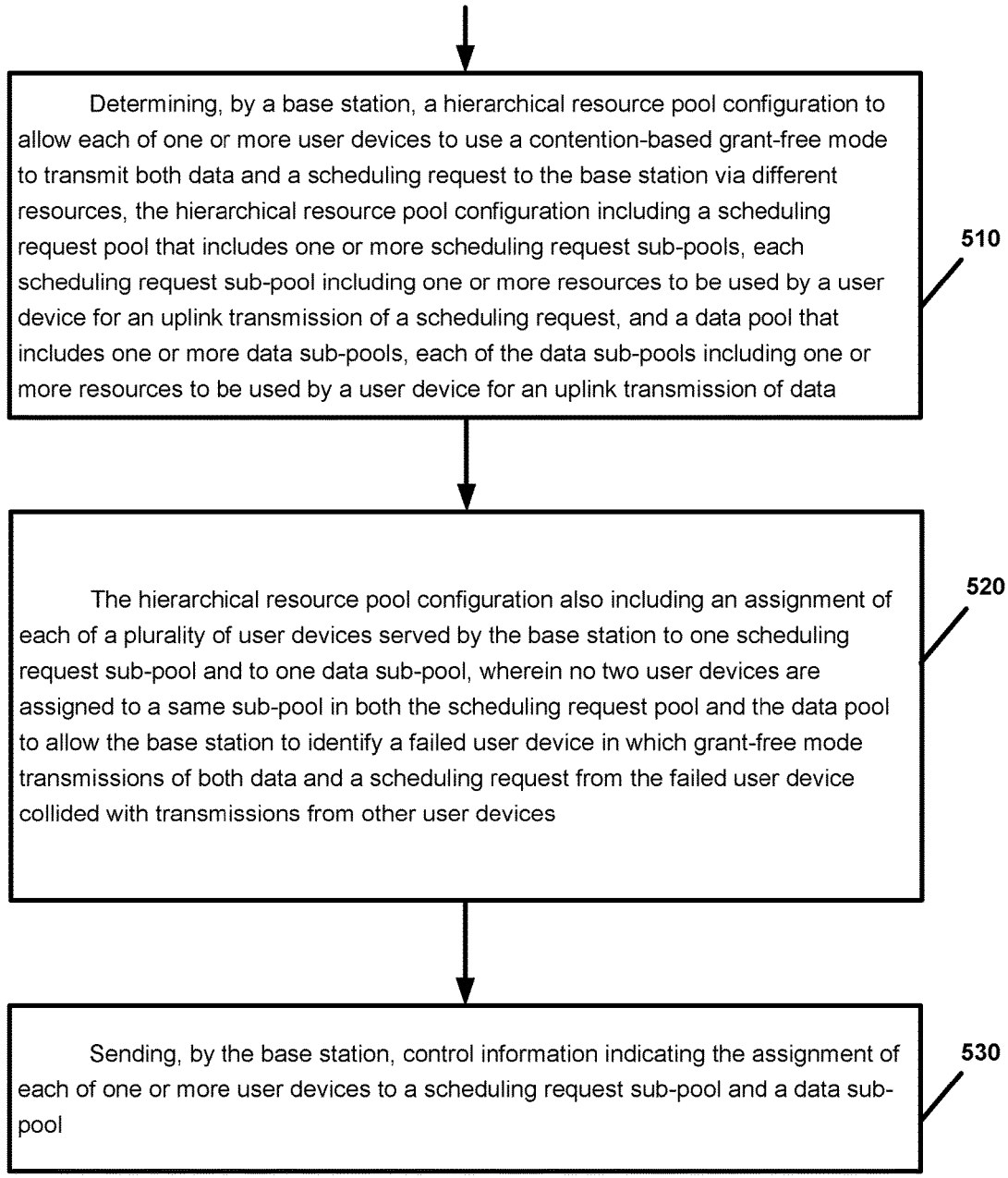
FIG. 5 is a flow chart illustrating operation of a base station according to an example implementation.

FIG. 5 is a flow chart illustrating operation of a base station according to an example implementation. Operation 510 includes determining, by a base station, a hierarchical resource pool configuration to allow each of one or more user devices to use a contention-based grant-free mode to transmit both data and a scheduling request to the base station via different resources, the hierarchical resource pool configuration including a scheduling request pool that includes one or more scheduling request sub-pools, each scheduling request sub-pool including one or more resources to be used by a user device for an uplink transmission of a scheduling request, and a data pool that includes one or more data sub-pools, each of the data sub-pools including one or more resources to be used by a user device for an uplink transmission of data. At operation 520, the hierarchical resource pool configuration also including an assignment of each of a plurality of user devices served by the base station to one scheduling request sub-pool and to one data sub-pool, wherein no two user devices are assigned to a same sub-pool in both the scheduling request pool and the data pool to allow the base station to identify a failed user device in which grant-free mode transmissions of both data and a scheduling request from the failed user device collided with transmissions from other user devices. Operation 530 includes sending, by the base station, control information indicating the assignment of each of one or more user devices to a scheduling request sub-pool and a data sub-pool.

Example 8

According to an example implementation of the method of example 7, and further comprising: determining, based on at least one received data and at least one received scheduling request and the assignment of user devices to one or more scheduling request sub-pools and assignment of user devices to one or more data sub-pools, that both data and a scheduling request transmitted from the failed user device collided with transmissions from other user devices; and transmitting, by the base station in response to determining that both data and a scheduling request transmitted from the failed user device collided with transmissions from other user devices, an uplink grant to the failed user device.

Example 9

According to an example implementation of the method of any of examples 7-8, and further comprising: receiving, by the base station, a first scheduling request, but not first data, from a first user device that transmitted both the first scheduling request and the first data at the same time using a grant-free mode; receiving, by the base station, a second data, but not a second scheduling request, from a second user device that transmitted both the second scheduling request and the second data at the same time using a grant-free mode; determining a first set of user devices that share a data sub-pool with the first user device and a second set of user devices that share a scheduling request sub-pool with the second user device; determining that an overlap of the first set of user devices and the second set of user devices includes the failed user device; and determining, based on the overlap of the first and second sets of user devices, that both data and a scheduling request transmitted from the failed user device collided with the first data transmitted by the first user device and the second scheduling request transmitted by the second user device, respectively.

Example 10

According to an example implementation of the method of any of examples 7-8, and further comprising: detecting, by the base station, a change in a number of user devices served by the base station; determining, by the base station in response to the detecting of a change in a number of user devices served by the base station, an updated hierarchical resource pool configuration including at least an updated assignment of each of one or more user devices to a scheduling request sub-pool and a data sub-pool; and sending, by the base station, control information indicating the updated assignment of each of one or more user devices to a scheduling request sub-pool and a data sub-pool.

Example 11

According to an example implementation of the method of any of examples 7-10, wherein the determining an updated hierarchical resource pool configuration comprises performing one or more of the following: changing a number of data sub-pools in the data pool; changing a number of resources in one or more data sub-pools; changing an assignment of one or more user devices to one or more of the data sub-pools; changing a number of scheduling request sub-pools in the scheduling request pool; changing a number of resources in one or more scheduling request sub-pools; and changing an assignment of one or more user devices to one or more of the data sub-pools.

Example 12

According to an example implementation of the method of any of examples 7-11, wherein the hierarchical resource pool configuration also includes a dedicated resource, within either the assigned scheduling request sub-pool or the assigned data pool for a user device, for each of one or more user devices served by the base station.

Example 13

According to an example implementation an apparatus comprises at least one processor and at least one memory including computer instructions, when executed by the at least one processor, cause the apparatus to perform the method of any of examples 7-12.

Example 14

According to an example implementation, a computer program product comprising a non-transitory computer-readable storage medium, the computer-readable storage medium storing executable code that, when executed by at least one data processing apparatus, is configured to cause the at least one data processing apparatus to perform a method of any of examples 7-12.

Example 15

Figure 6:
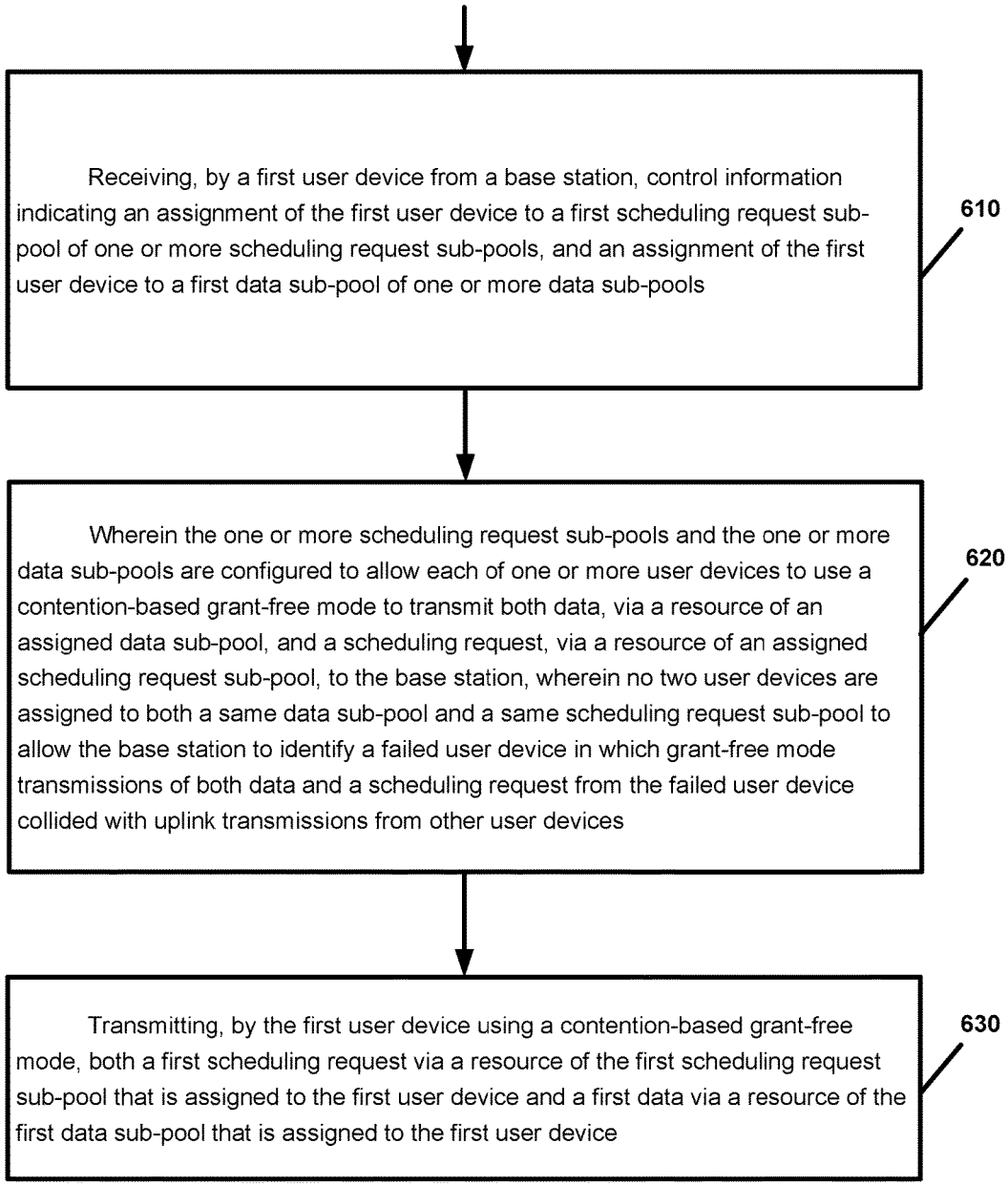
FIG. 6 is a flow chart illustrating operation of a user device/UE according to another example implementation.

FIG. 6 is a flow chart illustrating operation of a user device/UE according to an example implementation. Operation 610 includes receiving, by a first user device from a base station, control information indicating an assignment of the first user device to a first scheduling request sub-pool of one or more scheduling request sub-pools, and an assignment of the first user device to a first data sub-pool of one or more data sub-pools. Operation 620 includes wherein the one or more scheduling request sub-pools and the one or more data sub-pools are configured to allow each of one or more user devices to use a contention-based grant-free mode to transmit both data, via a resource of an assigned data sub-pool, and a scheduling request, via a resource of an assigned scheduling request sub-pool, to the base station, wherein no two user devices are assigned to both a same data sub-pool and a same scheduling request sub-pool to allow the base station to identify a failed user device in which grant-free mode transmissions of both data and a scheduling request from the failed user device collided with uplink transmissions from other user devices. Operation 630 includes transmitting, by the first user device using a contention-based grant-free mode, both a first scheduling request via a resource of the first scheduling request sub-pool that is assigned to the first user device and a first data via a resource of the first data sub-pool that is assigned to the first user device.

Example 16

According to an example implementation of the method of example 15, and further comprising: receiving, by the first user device from the base station in response to the base station detecting that both the first scheduling request and the first data transmitted by the first user device collided with transmissions from other user devices, an uplink grant that identifies a dedicated resource for the first user device to retransmit the first data; and retransmitting, by the first user device to the base station, the first data via the dedicated resource.

Example 17

According to an example implementation of the method of any of examples 15-16, wherein the retransmitting comprises at least one of the following: performing a HARQ (hybrid ARQ) retransmission of a same redundancy version of the first data via the dedicated resource; and performing a HARQ (hybrid ARQ) retransmission of a different redundancy version of the first data via the dedicated resource.

Example 18

An apparatus comprising at least one processor and at least one memory including computer instructions, when executed by the at least one processor, cause the apparatus to perform the method of any of examples 15-17.

Example 19

A computer program product comprising a non-transitory computer-readable storage medium, the computer-readable storage medium storing executable code that, when executed by at least one data processing apparatus, is configured to cause the at least one data processing apparatus to perform a method of any of examples 15-17.

Example 20

According to an example implementation of the method of any of examples 15-17, wherein the hierarchical resource pool configuration also includes a dedicated resource, within either the assigned scheduling request sub-pool or the assigned data pool for a user device, for each of one or more user devices served by the base station.

Example 21

Figure 7:
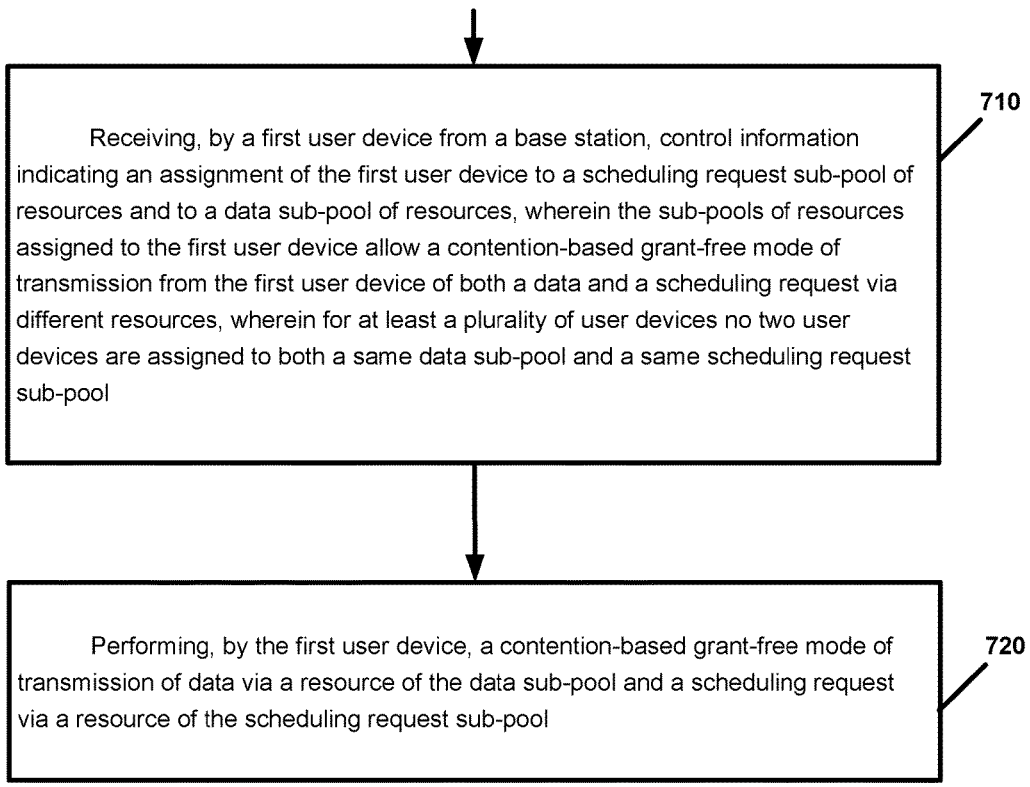
FIG. 7 is a flow chart illustrating operation of a user device/UE according to another example implementation.

FIG. 7 is a flow chart illustrating operation of a user device/UE according to another example implementation. Operation 710 includes receiving, by a first user device from a base station, control information indicating an assignment of the first user device to a scheduling request sub-pool of resources and to a data sub-pool of resources, wherein the sub-pools of resources assigned to the first user device allow a contention-based grant-free mode of transmission from the first user device of both a data and a scheduling request via different resources, wherein for at least a plurality of user devices no two user devices are assigned to both a same data sub-pool and a same scheduling request sub-pool. And, operation 720 includes performing, by the first user device, a contention-based grant-free mode of transmission of data via a resource of the data pool and a scheduling request via a resource of the scheduling request pool.

Example 22

According to an example implementation of the method of example 21, wherein the performing comprises: performing, by the first user device, a contention-based grant-free mode of transmission, of both data via a resource of the data pool and a scheduling request via a resource of the scheduling request pool.

Example 23

According to an example implementation of the method of any of examples 21-22, and further comprising: receiving, by the first user device from the base station in response to the base station detecting that both the scheduling request and the data transmitted by the first user device collided with transmissions from other user devices, an uplink grant that identifies a dedicated resource for the first user device to retransmit the first data; and retransmitting, by the first user device to the base station, the data via the dedicated resource.

Example 24

Figure 8:
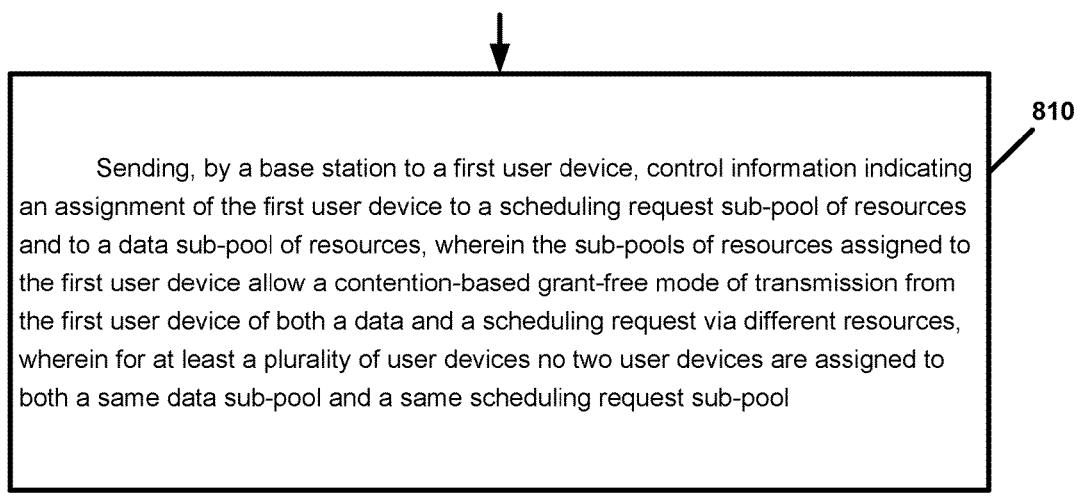
FIG. 8 is a flow chart illustrating operation of a base station according to another example implementation.

FIG. 8 is a flow chart illustrating operation of a base station according to another example implementation. Operation 810 includes sending, by a base station to a first user device, control information indicating an assignment of the first user device to a scheduling request sub-pool of resources and to a data sub-pool of resources, wherein the sub-pools of resources assigned to the first user device allow a contention-based grant-free mode of transmission from the first user device of both a data and a scheduling request via different resources, wherein for at least a plurality of user devices no two user devices are assigned to both a same data sub-pool and a same scheduling request sub-pool.

Example 25

According to an example implementation of the method of example 26, and further comprising: receiving, by the base station from the first user device, a contention-based grant-free transmission of data via a resource of the data pool and a scheduling request via a resource of the scheduling request pool.

Example 26

According to an example implementation of the method of any of examples 24-25, and further comprising: determining, by the base station, that both the scheduling request and the data transmitted by the first user device collided with transmissions from other user devices; and sending, by the base station to the user device in response to the base station detecting that both the scheduling request and the data transmitted by the first user device collided with transmissions from other user devices, an uplink grant that identifies a dedicated resource for the first user device to retransmit the data.

Example 27

According to an example implementation of the method of any of examples 24-26, and further comprising: receiving, by the base station from the user, the data via the dedicated resource.

Example 28

According to an example implementation, an apparatus comprising at least one processor and at least one memory including computer instructions, when executed by the at least one processor, cause the apparatus to perform the method or operations of or within any of examples 1-27.

Example 29

According to an example implementation, an apparatus comprising means for performing any methods or operations within any of examples 1-27.

Figure 9:
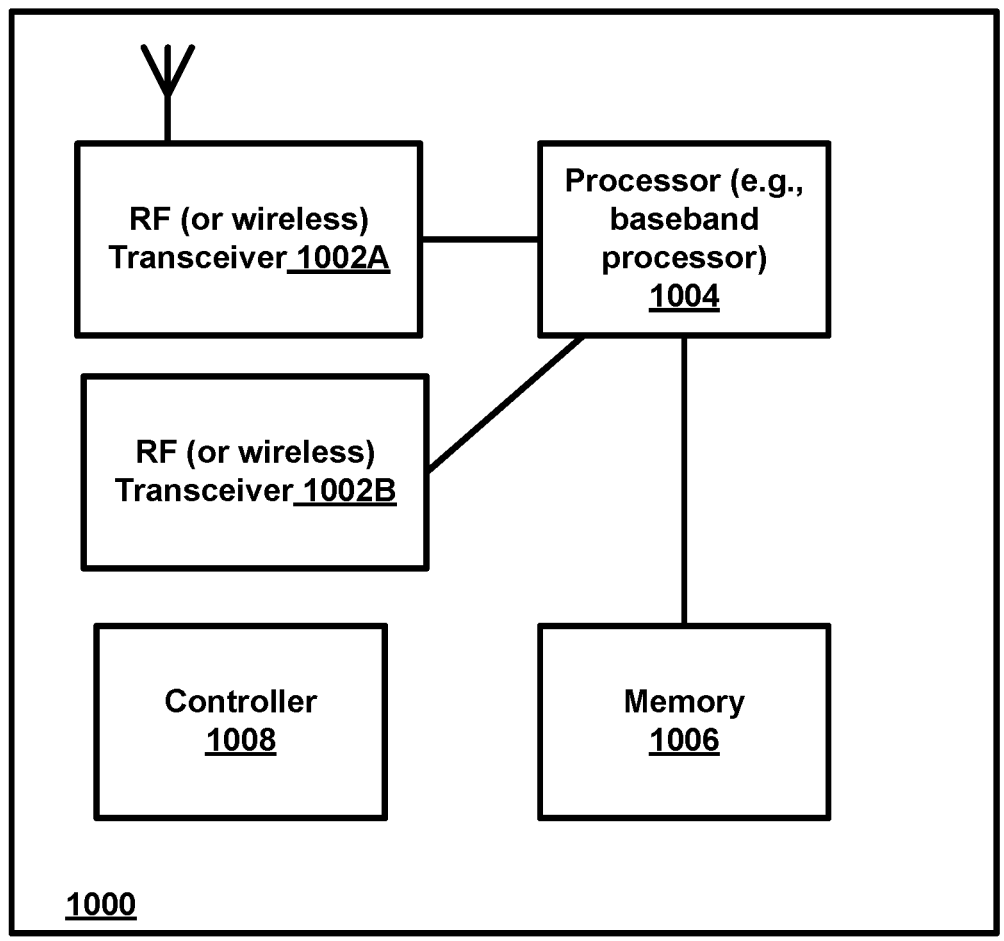
FIG. 9 is a block diagram of a node or wireless station (e.g., base station/access point or mobile station/user device/UE) according to an example implementation.

FIG. 9 is a block diagram of a wireless station (e.g., AP, BS, eNB, UE or user device) 1000 according to an example implementation. The wireless station 1000 may include, for example, one or two RF (radio frequency) or wireless transceivers 1002A, 1002B, where each wireless transceiver includes a transmitter to transmit signals and a receiver to receive signals. The wireless station also includes a processor or control unit/entity (controller) 1004 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002 (1002A or 1002B). Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above. Processor 1004 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 9, a controller (or processor) 1008 may execute software and instructions, and may provide overall control for the station 1000, and may provide control for other systems not shown in FIG. 9 such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example implementation, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (JOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   receiving, by a first user device from a base station, control information indicating an assignment of the first user device to a first scheduling request sub-pool of resources of one or more scheduling request sub-pools, and an assignment of the first user device to a first data sub-pool of resources of one or more data sub-pools, wherein the sub-pools assigned to the first user device allow a contention-based grant-free mode transmission from the first user device of both a data and a scheduling request via different resources;
   wherein for at least a plurality of user devices, no two user devices are assigned to both a same data sub-pool and a same scheduling request sub-pool to allow the base station to detect a collision condition for the first user device with respect to both data and a scheduling request, in which a grant-free mode transmission of both a data and a scheduling request at the same time from the first user device collided with uplink transmissions from other user devices.

2. The method of claim 1 and further comprising:
   performing, by the first user device, a contention-based grant-free mode transmission at the same time of both a data, via a resource of the assigned first data sub-pool, and a scheduling request, via a resource of the first scheduling request sub-pool.

3. A method of claim 1 and further comprising:
   receiving, by the first user device from the base station, an uplink grant that identifies a dedicated resource for the first user device to retransmit the data;
   retransmitting, by the first user device to the base station, the data via the dedicated resource.

4. The method of claim 1 wherein the assignment for the first user device comprises a dedicated resource that is dedicated to the first user device and is not shared among multiple user devices, the dedicated resource being from either the first scheduling request sub-pool or the first the data sub-pool.

5. An apparatus comprising at least one processor and at least one memory including computer instructions, when executed by the at least one processor, cause the apparatus to:
   receive, by a first user device from a base station, control information indicating an assignment of the first user device to a first scheduling request sub-pool of resources of one or more scheduling request sub-pools, and an assignment of the first user device to a first data sub-pool of resources of one or more data sub-pools, wherein the sub-pools assigned to the first user device allow a contention-based grant-free mode transmission from the first user device of both a data and a scheduling request via different resources;
   wherein for at least a plurality of user devices, no two user devices are assigned to both a same data sub-pool and a same scheduling request sub-pool to allow the base station to detect a collision condition for the first user device with respect to both data and a scheduling request, in which a grant-free mode transmission of both a data and a scheduling request at the same time from the first user device collided with uplink transmissions from other user devices.

6. A method comprising:
   determining, by a base station, a hierarchical resource pool configuration to allow each of one or more user devices to use a contention-based grant-free mode to transmit both data and a scheduling request to the base station via different resources, the hierarchical resource pool configuration including a scheduling request pool that includes one or more scheduling request sub-pools, each scheduling request sub-pool including one or more resources to be used by a user device for an uplink transmission of a scheduling request, and a data pool that includes one or more data sub-pools, each of the data sub-pools including one or more resources to be used by a user device for an uplink transmission of data;
   the hierarchical resource pool configuration also including an assignment of each of a plurality of user devices served by the base station to one scheduling request sub-pool and to one data sub-pool, wherein no two user devices are assigned to a same sub-pool in both the scheduling request pool and the data pool to allow the base station to identify a failed user device in which grant-free mode transmissions of both data and a scheduling request from the failed user device collided with transmissions from other user devices; and
   sending, by the base station, control information indicating the assignment of each of one or more user devices to a scheduling request sub-pool and a data sub-pool.

7. The method of claim 6 and further comprising:
   determining, based on at least one received data and at least one received scheduling request and the assignment of user devices to one or more scheduling request sub-pools and assignment of user devices to one or more data sub-pools, that both data and a scheduling request transmitted from the failed user device collided with transmissions from other user devices; and
   transmitting, by the base station in response to determining that both data and a scheduling request transmitted from the failed user device collided with transmissions from other user devices, an uplink grant to the failed user device.

8. The method of claim 6 and further comprising:
   receiving, by the base station, a first scheduling request, but not first data, from a first user device that transmitted both the first scheduling request and the first data at the same time using a grant-free mode;
   receiving, by the base station, a second data, but not a second scheduling request, from a second user device that transmitted both the second scheduling request and the second data at the same time using a grant-free mode;
   determining a first set of user devices that share a data sub-pool with the first user device and a second set of user devices that share a scheduling request sub-pool with the second user device;
   determining that an overlap of the first set of user devices and the second set of user devices includes the failed user device; and
   determining, based on the overlap of the first and second sets of user devices, that both data and a scheduling request transmitted from the failed user device collided with the first data transmitted by the first user device and the second scheduling request transmitted by the second user device, respectively.

9. The method of claim 6 and further comprising:
detecting, by the base station, a change in a number of user devices served by the base station;
determining, by the base station in response to the detecting of a change in a number of user devices served by the base station, an updated hierarchical resource pool configuration including at least an updated assignment of each of one or more user devices to a scheduling request sub-pool and a data sub-pool; and
sending, by the base station, control information indicating the updated assignment of each of one or more user devices to a scheduling request sub-pool and a data sub-pool.

10. The method of claim 9 wherein the determining an updated hierarchical resource pool configuration comprises performing one or more of the following:
changing a number of data sub-pools in the data pool;
changing a number of resources in one or more data sub-pools;
changing an assignment of one or more user devices to one or more of the data sub-pools;
changing a number of scheduling request sub-pools in the scheduling request pool;
changing a number of resources in one or more scheduling request sub-pools; and
changing an assignment of one or more user devices to one or more of the data sub-pools.

11. The method of claim 6 wherein the hierarchical resource pool configuration also includes a dedicated resource, within either the assigned scheduling request sub-pool or the assigned data pool for a user device, for each of one or more user devices served by the base station.

12. An apparatus comprising at least one processor and at least one memory including computer instructions, when executed by the at least one processor, cause the apparatus to:
determine, by a base station, a hierarchical resource pool configuration to allow each of one or more user devices to use a contention-based grant-free mode to transmit both data and a scheduling request to the base station via different resources, the hierarchical resource pool configuration including a scheduling request pool that includes one or more scheduling request sub-pools, each scheduling request sub-pool including one or more resources to be used by a user device for an uplink transmission of a scheduling request, and a data pool that includes one or more data sub-pools, each of the data sub-pools including one or more resources to be used by a user device for an uplink transmission of data;
the hierarchical resource pool configuration also including an assignment of each of a plurality of user devices served by the base station to one scheduling request sub-pool and to one data sub-pool, wherein no two user devices are assigned to a same sub-pool in both the scheduling request pool and the data pool to allow the base station to identify a failed user device in which grant-free mode transmissions of both data and a scheduling request from the failed user device collided with transmissions from other user devices; and
send, by the base station, control information indicating the assignment of each of one or more user devices to a scheduling request sub-pool and a data sub-pool.

13. A computer program product comprising a non-transitory computer-readable storage medium, the computer-readable storage medium storing executable code that, when executed by at least one data processing apparatus, is configured to cause the at least one data processing apparatus to perform a method of:
determining, by a base station, a hierarchical resource pool configuration to allow each of one or more user devices to use a contention-based grant-free mode to transmit both data and a scheduling request to the base station via different resources, the hierarchical resource pool configuration including a scheduling request pool that includes one or more scheduling request sub-pools, each scheduling request sub-pool including one or more resources to be used by a user device for an uplink transmission of a scheduling request, and a data pool that includes one or more data sub-pools, each of the data sub-pools including one or more resources to be used by a user device for an uplink transmission of data;
the hierarchical resource pool configuration also including an assignment of each of a plurality of user devices served by the base station to one scheduling request sub-pool and to one data sub-pool, wherein no two user devices are assigned to a same sub-pool in both the scheduling request pool and the data pool to allow the base station to identify a failed user device in which grant-free mode transmissions of both data and a scheduling request from the failed user device collided with transmissions from other user devices; and
sending, by the base station, control information indicating the assignment of each of one or more user devices to a scheduling request sub-pool and a data sub-pool.

14. A method comprising:
receiving, by a first user device from a base station, control information indicating an assignment of the first user device to a first scheduling request sub-pool of one or more scheduling request sub-pools, and an assignment of the first user device to a first data sub-pool of one or more data sub-pools;
wherein the one or more scheduling request sub-pools and the one or more data sub-pools are configured to allow each of one or more user devices to use a contention-based grant-free mode to transmit both data, via a resource of an assigned data sub-pool, and a scheduling request, via a resource of an assigned scheduling request sub-pool, to the base station, wherein no two user devices are assigned to both a same data sub-pool and a same scheduling request sub-pool to allow the base station to identify a failed user device in which grant-free mode transmissions of both data and a scheduling request from the failed user device collided with uplink transmissions from other user devices; and
transmitting, by the first user device using a contention-based grant-free mode, both a first scheduling request via a resource of the first scheduling request sub-pool that is assigned to the first user device and a first data via a resource of the first data sub-pool that is assigned to the first user device.

15. A method of claim 14 and further comprising:
receiving, by the first user device from the base station in response to the base station detecting that both the first scheduling request and the first data transmitted by the first user device collided with transmissions from other user devices, an uplink grant that identifies a dedicated resource for the first user device to retransmit the first data;
retransmitting, by the first user device to the base station, the first data via the dedicated resource.

16. The method of claim 14 wherein the retransmitting comprises at least one of the following:
performing a HARQ (hybrid ARQ) retransmission of a same redundancy version of the first data via the dedicated resource; and
performing a HARQ (hybrid ARQ) retransmission of a different redundancy version of the first data via the dedicated resource.

17. The method of claim 14 wherein the hierarchical resource pool configuration also includes a dedicated resource, within either the assigned scheduling request sub-pool or the assigned data pool for a user device, for each of one or more user devices served by the base station.

18. An apparatus comprising at least one processor and at least one memory including computer instructions, when executed by the at least one processor, cause the apparatus to:
receive, by a first user device from a base station, control information indicating an assignment of the first user device to a first scheduling request sub-pool of one or more scheduling request sub-pools, and an assignment of the first user device to a first data sub-pool of one or more data sub-pools;
wherein the one or more scheduling request sub-pools and the one or more data sub-pools are configured to allow each of one or more user devices to use a contention-based grant-free mode to transmit both data, via a resource of an assigned data sub-pool, and a scheduling request, via a resource of an assigned scheduling request sub-pool, to the base station, wherein no two user devices are assigned to both a same data sub-pool and a same scheduling request sub-pool to allow the base station to identify a failed user device in which grant-free mode transmissions of both data and a scheduling request from the failed user device collided with uplink transmissions from other user devices; and
transmit, by the first user device using a contention-based grant-free mode, both a first scheduling request via a resource of the first scheduling request sub-pool that is assigned to the first user device and a first data via a resource of the first data sub-pool that is assigned to the first user device.

19. A computer program product comprising a non-transitory computer-readable storage medium, the computer-readable storage medium storing executable code that, when executed by at least one data processing apparatus, is configured to cause the at least one data processing apparatus to perform a method of:
receiving, by a first user device from a base station, control information indicating an assignment of the first user device to a first scheduling request sub-pool of one or more scheduling request sub-pools, and an assignment of the first user device to a first data sub-pool of one or more data sub-pools;
wherein the one or more scheduling request sub-pools and the one or more data sub-pools are configured to allow each of one or more user devices to use a contention-based grant-free mode to transmit both data, via a resource of an assigned data sub-pool, and a scheduling request, via a resource of an assigned scheduling request sub-pool, to the base station, wherein no two user devices are assigned to both a same data sub-pool and a same scheduling request sub-pool to allow the base station to identify a failed user device in which grant-free mode transmissions of both data and a scheduling request from the failed user device collided with uplink transmissions from other user devices; and
transmitting, by the first user device using a contention-based grant-free mode, both a first scheduling request via a resource of the first scheduling request sub-pool that is assigned to the first user device and a first data via a resource of the first data sub-pool that is assigned to the first user device.

20. A method comprising:
receiving, by a first user device from a base station, control information indicating an assignment of the first user device to a scheduling request sub-pool of resources and to a data sub-pool of resources, wherein the sub-pools of resources assigned to the first user device allow a contention-based grant-free mode of transmission from the first user device of both a data and a scheduling request via different resources, wherein for at least a plurality of user devices, no two user devices are assigned to both a same data sub-pool and a same scheduling request sub-pool to allow the base station to detect a collision condition for the first user device with respect to both data and a scheduling request, in which a grant-free mode transmission of both a data and a scheduling request at the same time from the first user device collided with uplink transmissions from other user devices; and
performing, by the first user device, a contention-based grant-free mode of transmission of data via a resource of the data sub-pool and a scheduling request via a resource of the scheduling request sub-pool.

21. The method of claim 20 wherein the performing comprises:
performing, by the first user device, a contention-based grant-free mode of transmission, at the same time, of both data via a resource of the data sub-pool and a scheduling request via a resource of the scheduling request sub-pool.

22. The method of claim 20 and further comprising:
receiving, by the first user device from the base station in response to the base station detecting that both the scheduling request and the data transmitted by the first user device collided with transmissions from other user devices, an uplink grant that identifies a dedicated resource for the first user device to retransmit the first data;
retransmitting, by the first user device to the base station, the data via the dedicated resource.

23. A method comprising:
sending, by a base station to a first user device, control information indicating an assignment of the first user device to a scheduling request sub-pool of resources and to a data sub-pool of resources, wherein the sub-pools of resources assigned to the first user device allow a contention-based grant-free mode of transmission from the first user device of both a data and a scheduling request via different resources, wherein for at least a plurality of user devices no two user devices are assigned to both a same data sub-pool and a same scheduling request sub-pool to allow the base station to detect a collision condition for the first user device with respect to both data and a scheduling request, in which a grant-free mode transmission of both a data and a scheduling request at the same time from the first user device collided with uplink transmissions from other user devices.

24. The method of claim 23 and further comprising:
receiving, by the base station from the first user device, a contention-based grant-free transmission of data via a resource of the data pool and a scheduling request via a resource of the scheduling request pool.

25. A method of claim 23 and further comprising:

determining, by the base station, that both the scheduling request and the data transmitted by the first user device collided with transmissions from other user devices; and sending, by the base station to the user device in response to the base station detecting that both the scheduling request and the data transmitted by the first user device collided with transmissions from other user devices, an uplink grant that identifies a dedicated resource for the first user device to retransmit the data.

26. A method of claim 25 and further comprising:

receiving, by the base station from the user, the data via the dedicated resource.

27. A computer program product comprising a non-transitory computer-readable storage medium, the computer-readable storage medium storing executable code that, when executed by at least one data processing apparatus, is configured to cause the at least one data processing apparatus to perform a method of:

receiving, by a first user device from a base station, control information indicating an assignment of the first user device to a first scheduling request sub-pool of resources of one or more scheduling request sub-pools, and an assignment of the first user device to a first data sub-pool of resources of one or more data sub-pools, wherein the sub-pools assigned to the first user device allow a contention-based grant-free mode transmission from the first user device of both a data and a scheduling request via different resources;

wherein for at least a plurality of user devices, no two user devices are assigned to both a same data sub-pool and a same scheduling request sub-pool to allow the base station to detect a collision condition for the first user device with respect to both data and a scheduling request, in which a grant-free mode transmission of both a data and a scheduling request at the same time from the first user device collided with uplink transmissions from other user devices.

* * * * *